(12) United States Patent
Mishra et al.

(10) Patent No.: US 10,346,551 B2
(45) Date of Patent: Jul. 9, 2019

(54) SYSTEMS, METHODS AND COMPUTER-ACCESSIBLE MEDIUMS FOR UTILIZING PATTERN MATCHING IN STRINGOMES

(71) Applicant: New York University, New York, NY (US)

(72) Inventors: Bhubaneswar Mishra, Great Neck, NY (US); Paolo Ferragina, Pisa (IT)

(73) Assignee: New York University, New York, NY (US)

( * ) Notice: Subject to any disclaimer, the term of this patent is extended or adjusted under 35 U.S.C. 154(b) by 716 days.

(21) Appl. No.: 14/763,310

(22) PCT Filed: Jan. 24, 2014

(86) PCT No.: PCT/US2014/012901
§ 371 (c)(1),
(2) Date: Jul. 24, 2015

(87) PCT Pub. No.: WO2014/116921
PCT Pub. Date: Jul. 31, 2014

(65) Prior Publication Data
US 2015/0356147 A1    Dec. 10, 2015

Related U.S. Application Data

(60) Provisional application No. 61/756,170, filed on Jan. 24, 2013.

(51) Int. Cl.
*G06F 17/30*    (2006.01)
(52) U.S. Cl.
CPC .. *G06F 17/30528* (2013.01); *G06F 17/30371* (2013.01); *G06F 17/30595* (2013.01); *G06F 17/30958* (2013.01)

(58) Field of Classification Search
CPC ........ G06F 17/30528; G06F 17/30371; G06F 17/30595; G06F 17/30958; G06F 17/30153; G06F 3/0638; H03M 7/30; H04L 69/04
See application file for complete search history.

(56) References Cited

U.S. PATENT DOCUMENTS 7,734,671 B1    6/2010   Ferguson
9,684,543 B1 *  6/2017   Bequet ................... H04L 67/10
(Continued)

FOREIGN PATENT DOCUMENTS

WO    WO 2007/103759    9/2007

OTHER PUBLICATIONS

Vicknair et al., A comparison of a Graph Database and a Relational Database, Apr. 2010, 6 pages. (Year: 2010).*
(Continued)

*Primary Examiner* — Noosha Arjomandi
(74) *Attorney, Agent, or Firm* — Hunton Andrews Kurth LLP

(57) ABSTRACT

Exemplary systems, methods and computer-accessible mediums can receive first data related to at least one first string arranged in a directed acyclic graph, compress the first data into second data, and can search the second data for a match of at least one second string. A node of the directed acyclic graph can encode at least one substring, and an edge of the directed acyclic graph can encode instructions for concatenating substrings.

20 Claims, 3 Drawing Sheets

(56) References Cited

U.S. PATENT DOCUMENTS

| | | | | |
|---|---|---|---|---|
| 9,836,576 | B1* | 12/2017 | Do | G06N 7/005 |
| 2003/0028896 | A1* | 2/2003 | Swart | H04N 7/17318 |
| | | | | 725/127 |
| 2003/0120630 | A1 | 6/2003 | Tunkelang | |
| 2003/0158895 | A1* | 8/2003 | Mehra | H04L 29/06 |
| | | | | 709/203 |
| 2007/0013967 | A1* | 1/2007 | Ebaugh | G06F 17/30613 |
| | | | | 358/448 |
| 2008/0126400 | A1* | 5/2008 | Mitsuishi | G06F 17/30882 |
| 2009/0095142 | A1* | 4/2009 | Pearlman | G09B 15/026 |
| | | | | 84/473 |
| 2010/0205172 | A1 | 8/2010 | Luk | |
| 2011/0029549 | A1* | 2/2011 | Pandya | G11C 15/00 |
| | | | | 707/758 |
| 2012/0191684 | A1* | 7/2012 | Epstein | G06F 17/30864 |
| | | | | 707/706 |
| 2013/0110839 | A1* | 5/2013 | Kirshenbaum | G06F 17/30705 |
| | | | | 707/740 |
| 2013/0282703 | A1* | 10/2013 | Puterman-Sobe | |
| | | | | G06F 17/3061 |
| | | | | 707/723 |
| 2013/0290352 | A1* | 10/2013 | Chen | G06F 17/30389 |
| | | | | 707/752 |
| 2014/0143281 | A1* | 5/2014 | Duan | G06F 17/30292 |
| | | | | 707/798 |
| 2015/0052331 | A1* | 2/2015 | Dhurjati | G06F 9/3885 |
| | | | | 712/30 |
| 2015/0261881 | A1* | 9/2015 | Wensel | G06F 17/30958 |
| | | | | 707/798 |

OTHER PUBLICATIONS

Kemal Erdogan, A Model to Represent Directed Acyclic Graphs (DAG) on SQL Databases. Jan. 2008, 17 pages (Year: 2008).*

International Serach Report for International Application No. PCT/US2014/012901 dated May 15, 2014.

Written Opinion for International Application No. PCT/US2014/012901 dated May 15, 2014.

Navarro, Gonzalo, "Improved approximate pattern matching on hypertext," In Proc. Latin, Lecture Notes in Computer Science, vol. 1380, pp. 352-357, 1998.

Navarro, Gonzalo, "Improved approximate pattern matching on hypertext," Theoretical Computer Science, vol. 237, Nos. 1-2, pp. 455-463, 2000.

Mishra, B., "The Genome Question: Moore vs. Jevons," Jnl. of Computing of the Computer Society of India, pp. 1-18, 2012.

Hon, Wing-Kai et al,. "On Entropy-compressed text indexing in external memory," In Procs of the SYmposium on String Processing and Information Retrieval (SPIRE), vol. 5721 of Lecture Notes in Computer Science, pp. 75-89. Springer, 2009.

Navarro, Gonzalo, "Compressed full-text indexes," ACM Computing Surveys, vol. 39, No. 1, pp. 1-79, 2007.

Navarro, Gonzalo. "Implementing the Iz-index: Theory versus practice," ACM Journal of Experimental Algorithmics, vol. 13, 2008.

Park, Kunsoo et al., "String matching in hypertext," In Proc. CPM, Lecture Notes in Computer Science, vol. 937, pp. 318-329, 1995.

Navarro, Gonzalo. "Wavelet trees for all," In Proc. of the Symposium on Combinatorial Pattern Matching (CPM), vol. 7354 of Lecture Notes in Computer Science, pp. 2-26, Springer, 2012.

Menges, Fabian et al., "TotalRecaller: Improved accuracy and performance via integrated alignment and base-calling," Bioinformatics, vol. 27, No. 17, pp. 2330-2337, 2011.

Ferragina, Paolo et al., "The string B-tree: A new data structure for string search in external memory and its applications," Journal of the ACM, vol. 46, No. 2, pp. 236-280, 1999.

Ferragina, Paolo et al., "Indexing compressed text," Journal of the ACM, vol. 52, No. 4, pp. 552-581, 2005.

Jaja, Joseph et al., "Space-efficient and fast algorithms for multidimensional dominance reporting and counting," In Proc. ISAAC, vol. 3341 of Lecture Notes in Computer Science, pp. 558-568, 2004.

Manber, Udi et al., "Approximate string matching with arbitrary costs for text and hypertext," In Proc. IAPR Workshop on Structural and Syntactic Pattern Recognition, pp. 22-33, 1992.

Ferragina, Paolo et al., "Lightweight data indexing and compression in external memory," Algorithmica, vol. 63, No. 3, pp. 707-730, 2012.

Kreft, Sebastian et al., "Self-indexing based on Iz77," In Proc. CPM, vol. 6661 of Lecture Notes in Computer Science, pp. 41-54, 2011.

Makinen, Veli et al., "Storage and retrieval of individual Genomes," In Proc. RECOMB, vol. 5541 of Lecture Notes in Computer Science, pp. 121-137, 2009.

Hon, Wing-Kai et al., "Compression, Indexing, and Retrieval for Massive String Data," In Procs of Symposium on Combinatorial Pattern MAtching (CPM), vol. 6129 of Lecture Notes in Computer Science, pp. 260-274, Springer, 2010.

Chien, Yu-Feng et al., "Geometric Burrows-wheeler Transform: Linking range searching and text indexing," In Procs of the Data Compression Conference (DCC), pp. 252-261, IEEE Computer Society, 2008.

Amir, Amihood et al., "Pattern Matching in Hypertext," In Proc. WADS, Lecture Notes in Computer Science, vol. 1272, pp. 160-173, 1997.

Ferragina, Paolo. "Handbook of Computational Molecular Biology, Chap. 35: String search in external memory: algorithms and data structures," Chapman & Hall/CRC Computer and Information Science Series, pp. 1-35, 2005.

Farzan, Arash et al., "Entropy-bounded representation of point grids," In Proc. ISAAC, vol. 6507 of Lecture Notes in Computer Science, pp. 327-338, 2010.

Yu, Chih-Chiang et al., "Efficient indexes for the positional pattern matching problem and two related problems over small alphabets," In Proc. ISAAC, vol. 6507 of Lecture Notes in Computer Science, pp. 13-24, 2010.

Arge, Lars et al., "I/o-Efficient spatial data structures for range queries," SIGSPATIAL Special, vol. 4, No. 2, pp. 2-7, 2012.

Alstrup, Stephen et al., "New Data structures for orthogonal range searching," In Proc. FOCS, pp. 198-207, 2000.

Akutsu, Tatsuya et al., "A linear time pattern matching algorithm between a string and a tree," In Proc. CPM, Lecture Notes in Computer Science, vol. 1272, pp. 1-10, 1993.

Afshani, Peyman et al., "Orthogonal range reporting in three and higher dimensions," In IEEE FOCS, pp. 149-158, 2009.

* cited by examiner

SYSTEMS, METHODS AND COMPUTER-ACCESSIBLE MEDIUMS FOR UTILIZING PATTERN MATCHING IN STRINGOMES

CROSS-REFERENCE TO RELATED APPLICATION(S)

This application relates to and claims the benefit and priority from International Patent Application No. PCT/US2014/012901 filed on Jan. 24, 2014, which claims the benefit and priority from U.S. Provisional Application Ser. No. 61/756,170 filed on Jan. 24, 2013, the entire disclosures of which are incorporated herein by reference.

FIELD OF THE DISCLOSURE

The present disclosure relates generally to pattern matching, and more specifically, to exemplary embodiments of systems, methods and computer-accessible mediums that can recognize patterns in strings, e.g., utilizing pattern matching in stringomes.

BACKGROUND INFORMATION

A "stringome" can be defined as a family of strings that can be obtained by the concatenation of a small number of shorter elemental strings (e.g., "stringlets"), which can additionally share many common structures, patterns, similarities or homologies with the stringome. In particular, these elemental strings can be partitioned into several classes such that the stringlets within a class are few in number, and may differ from each other by small edit-distances, thus giving rise to small number of "allelic forms" within each class. In a dynamic setting, the stringomes can evolve by adding, deleting or mutating the set of elemental strings, but can also evolve by changing the rules by which the strings can be concatenated in a stringome. The study of such combinatorial objects can be referred to as "stringomics," and can raise many combinatorial and algorithmic questions related to efficient pattern matching, query processing and statistical analysis, which would otherwise be prohibitively expensive in the absence of any imposed indexing structures and associated assumptions.

Stringomics can be similar to "pattern matching on hypertext," which was introduced by Manber and Wu in 1992. (See e.g., reference 20). In that scenario, the hypertext was modeled in the form of a graph of n nodes and m edges, each node storing one string, and edges indicating alternative texts-nodes that can follow the current text-node. The pattern, however, is still a simple (e.g., linear) string of length p. A pattern occurrence was defined as a path of text-nodes containing the pattern. Therefore, an occurrence can be thought of as internal to a text-node, or to span (e.g., a path of) several text-nodes.

In reference 20, an acyclic graph was considered, and all occ pattern occurrences in $O(N+p\ m+occ\ \log\log p)$ time were reported, where N can be the total length of the strings stored in the graph's nodes. Akutsu (see e.g., reference 3) improved the solution for the case of a tree structure in optimal time, while Park and Kim (see e.g., reference 17) extended this result to an $O(N+pm)$ time-algorithm for directed acyclic graphs ("DAG"), as well as for graphs with cycles, but only under the assumption that no text-node can match the pattern in two places. Subsequent to that, other researchers (see e.g., references 1, 23, 24) dealt with the problem of approximate pattern matching on hypertexts, showing that the problem can be solved in $O(pN)$ time and $O(N)$ space for cyclic and acyclic graphs.

Currently deployed genomics analysis algorithms are simple reincarnations of generic stringology algorithms that were developed in the most general unconstrained setting, and have failed to take advantage of the genome structure (e.g., what can be discerned in diploid eukaryotic genomes). For example, while devising algorithms to study a population of human genomes, the computational genomicists have not yet taken noticeable advantage of the genome-architecture of such structural elements as haplotype blocks, sparsity in variations, allelic frequencies, haplotype phasing, and/or population stratification, etc. New approaches that exploit these architectural structures to dramatically improve the algorithmic and communication complexity can benefit numerous genomic applications, for instance, Bayesian base calling genome assembly (both genotypic and haplotypic) (see e.g., reference 21), resequencing, and most importantly, the embryonic field of clinical genomics. (See e.g., reference 22). Another specialized, but an enormously critical, application comes from the field of onto-genomics analysis, which studies the genomes of a heterogeneous population of tumor cells and stroma, all undergoing rapid somatic evolution choreographed through cancer hallmarks, but also sculptured by the chemo- and radiation-based therapeutic interventions.

Although combinatorial objects (e.g., stringomes) are somewhat specialized, they are likely to enable many future algorithmic innovations. For example, just in the field of genomics, these can deliver many desperately needed tools to curb the data deluge, improve data-compression (both in transmission and storage), and ultimately, accelerate disease studies through intelligent pooling strategies. (See e.g., reference 22). Similar improvements can be foreseen in other related fields, for example, metagenomics, epigenomics, transcriptomics, microbiomics, and many others, as would be apparent to a person possessing skills in the related arts.

Generally, the above methods are batch-solutions that need to scan the entire graph, and the strings contained in its nodes, in order to count/report the pattern occurrences. Thus, it may be beneficial to provide exemplary systems, methods and computer-accessible mediums that are index-based solutions which can thus count/report the pattern occurrences in a time complexity which can be as independent as possible to the graph and string sizes, while remaining succinct/compressed in the occupied space, can exploit the structural properties of stringomics problems and can overcome at least some of the problems above.

Accordingly, there is a need to address and/or overcome at least some of the deficiencies described herein above.

SUMMARY OF EXEMPLARY EMBODIMENTS

As a consequence of the constrained nature of stringomes, they can be represented in a substantially compressed data structure, while allowing searching, indexing and pattern-matching to be carried out in an efficient manner (e.g., directly in hardware). In many domains, particularly in biology or linguistics, the stringomes can be used to directly represent and manipulate key sequence-information, which are known to be controlled by certain evolutionary dynamics. Certain empirical Bayesian algorithms that require repeated statistical estimation processes to be run on the data can be implemented efficiently with a stringomics structure without making additional assumptions or parametric formulations. The algorithmic studies in stringomics can be directly relevant to such emerging fields as genomics, epigenomics, transcriptomics and proteomics, which are all capable of generating increasingly massive amounts of raw data that can make a significant impact on human healthcare, agriculture, and manufacturing (e.g., green energy, pharmaceuticals, bio-remediable materials, etc.). Suitable modifications can also be utilized in hypertext processing, natural language processing and speech processing, as well as other applications of similar nature.

In Genomics, vast amounts of data can be generated from the genomic studies of organisms from related species, organisms from a single population but with a focus on polymorphic locations (e.g., Human Hapmap Project, Exom data from 1000 Genomes Project), or cells from a heterogeneous tumor undergoing somatic evolution. In each of these cases, a stringomic data structure and the related pattern-matching operations can be helpful in

- developing better priors for clinical genomic tools (e.g., TotalReCaller),
- dilution- or map-based approaches to haplotype sequence assembly (e.g., locations in stringomes obtained by TotalReCaller, arranged as an optimal directed path in the DAG; optimality chosen based on a technology-sensitive score function),
- performing Genome Wide Association Studies ("GWAS"), carried out on-the-fly on the data structure without any preprocessing steps (e.g., focusing only on tag-SNPs), and
- comparing two populations (either of organisms or cancer cells from two patients).

In Epigenomics, many similar questions can arise in the context of epigenetic modifications (e.g., in terms of methylation sites) and the exemplary systems, methods and computer-accessible mediums can help in coding the organ specific variations in epigenomics among the cells from different tissue types.

Transcriptomics, which can utilize much more immediate and critical attention from stringomics, is the application area of RNASeq, which aims to create a precise map of all the transcripts encoded in a complex genome (e.g., mammalian genomes, further, augmented with the measurements of their relative abundances). While RNASeq technology has led to some interesting algorithmic developments (e.g., Tophat, Cufflinks, Scriptures, etc.), much remains to be done, and the exemplary systems, methods and computer-accessible mediums can help, for example, in:

- improvement in accuracies of base-calling in cDNA by TotalRecaller (see e.g., reference 21) for transcriptomes, which is complicated by intron-exon boundaries and alternate splicing,
- discovery of unannotated transcripts, alternate splicing isoforms, noncoding or anti-sense transcripts, allelic variations within gene families (e.g., orthologs and paralogs) and
- efficient and compressed storage and transmission of single-cell and temporally-varying transcriptomes (e.g., from circulating tumor cells).

An exemplary core RNASeq application, can utilize several steps/procedures which can include:

1) development of mapped exons (including information from annotated genes, but also discovering unannotated exons, using TotalRecaller with sliding-windows mapped to reference-genome(s) as Bayesian priors),
2) a nave stringomic organization of the exons that can facilitate most or all possible splicing junctions, and
3) a statistical-refinement of the stringomic data-structures, based on online learning schemes from splice-junction reads.

Exemplary results can be expected to be very precise maps of the transcriptome of a complex genome that can be used directly by TotalReCaller (see, e.g., reference 22) for real-time-clinical transcriptomic applications.

For other omits, other similar applications of the exemplary systems, methods and computer-accessible mediums can be utilized in the context of micro-RNAs, microbiomics, and proteomics. Thus, the use of stringomic data-structures can significantly change how the basic biological questions are formulated.

The exemplary systems, methods and computer-accessible mediums according to exemplary embodiment of the present disclosure can improve algorithmic, storage and data-transmission demands created by the state-of-the art genomics analysis, sequencing and mapping-related biotechnologies, whole genome sequence assembly ("WGSA"), partial genome sequence assembly ("PGSA"), and genome-wide association studies ("GWAS").

According to exemplary embodiments of the present disclosure, it is possible to provide exemplary systems, methods and computer accessible mediums that can generate and query a string database, and can receive first data related to a string(s) arranged in a directed acyclic graph, compress and index the first data into second data, and search the second data for a match of a second string(s) provided at query time.

In certain exemplary embodiments of the present disclosure, a node(s) of the directed acyclic graph can encode a substring(s). An edge(s) of the directed acyclic graph can encode instruction for concatenating substrings. In further exemplary embodiments of the present disclosure, the first string(s) can include an input string, every one of which corresponds to a directed path in the directed acyclic graph. An edge(s) can be labeled by numerical weights, additional strings, a name, a category and/or an ontological information. A node(s) can be labeled by numerical weights, a name, a category and/or an ontological information. The category and/or the ontological information can be represented by a tree whose nodes are numbered according to a pre-order visit. Each of edge(s) occurrence can be counted using a geometric data structure that can support three-dimensional range queries. Each of node(s) occurrence can be turned into an edge(s) occurrence by turning each string into a path of shorter strings of a particular length. The directed acyclic graph can have two distinguished nodes that can be a source and/or a sink.

According to further exemplary embodiments, the directed acyclic graph can be changed dynamically, and the dynamic change can be performed with persistence and/or a version control. The compression can be performed by re-encoding the first string(s) with the addition of a delimiter(s) character that is not a part of an available alphabet of the first string(s). The compression and indexing can also be performed by reorganizing the string(s) using Suffix arrays, Tries, Patricia Tries, Burrows-Wheeler Transforms and/or B-Trees, or by adding any known self-indexing structure(s) to the first data. In some exemplary embodiments of the present disclosure, the self-indexing structures can be an index, such as Ferragina-Manzini indices, or Lempel-Ziv indices, or any other compressed full-text indices, and the indices can be represented as geometric ranges and can be organized according to computational geometric algorithms and/or data structures.

According to further exemplary embodiments of the present disclosure, systems, methods and computer-accessible mediums can be provided for generating and querying a string database which can receive first data related to input string(s). The input string(s) can comprise a plurality of substrings, and generate second data related to a DAG based on the first data. Each node of the DAG can correspond to one of the substrings of the input string(s), and an edge(s) of the DAG can encode instructions for concatenating the plurality substrings.

In further exemplary embodiments of the present disclosure, the encoding of the instructions can comprise one-to-one mapping between the input string(s) and a further input string, and the input string(s) can be formed by concatenating the substrings according to each directed path in the DAG. In some exemplary embodiments, the DAG can be a multi-partite graph corresponding to partitions of the substrings. A full-text index can be built which is based on the string(s), and count pattern occurrences in the full-text index. A geometric index can also be built/generated based on the DAG, and two-dimensional range queries can be solved based on the geometric index. Additionally, the DAG can be compressed. Node pattern occurrences can comprise combining further substrings into string(s) with a special delimiter character separating each of the further substrings. According to certain exemplary embodiments, edge occurrences can be counted by turning each edge into a substring and inserting special delimiter characters between each substring, or edge occurrences can be counted using range-query.

In additional exemplary embodiments of the present disclosure, the input string(s) can be or include a representation of at least one haplotype block, and the edge(s) can encode haplotype phasing. The input string(s) can be a representation of exons, and the one edge can splice junctions. The input string(s) can also be a representation of portion(s) of a document(s). According to certain exemplary embodiments, the portion(s) can be a chapter, a paragraph or a sentence, and the edge can represent different versions of the document(s). The document(s) can also be a wiki page. In further exemplary embodiments of the present disclosure, the DAG can be a multipartite graph, and parts of the multipartite graph can correspond to different versions of the portion(s) of the document(s). In some exemplary embodiments of the present disclosure, each of edge(s) occurrence can be turned and/or converted into a two-dimensional point in Euclidean space based on sorting of substrings, which can be normal and/or reversed.

For example, a search of these string objects can be performed to determine the occurrences of a substring, a pattern with an exact match to the substring, and can be performed with wild-card characters or with an allowance for errors and additional constraints. The occurrences can be described by a count of the number of occurrences or as a set of locational information. The occurrence can be a match in the node-string or a match in a string, implied by an edge straddling two strings from the neighboring nodes. The error could be unknown or its structures known a priori, and the constraints could be described in terms of the labels of the edges and the nodes. The pattern occurrence can also straddle more nodes, but in a constant number.

The exemplary system, method and computer-accessible medium according to certain exemplary embodiments of the present disclosure can be applied to the manipulation of string like objects occurring naturally in the fields of Genomics, Transcriptomics, Epigenomics, Hyper-Texts, Software Code, Speech, Music, although not limited thereto.

In Genomics and Epigenomics, the strings within the node can encode haplotype blocks and the edges, haplotype phasing information. The labels on the nodes and edges can correspond to CpG islands, Methylation status, population-stratification, traits, disease status, and/or information. The data-structures can be used in the applications related to clinical genomic tools, in whole-genome sequence assembly, and/or genome-wide association studies, although not limited thereto.

In Transcriptomics, the strings within the node can encode exon information and the edges, can be possible exon-intron splicing junctions. The labels on the nodes and edges can correspond to multiple alternate splicing isoforms of a gene corresponding to known annotations, or to un-annotated regions of a genome (e.g., open reading frames). The data-structures can be used in clinical genomic tools, in scientific discovery tools to find novel un-annotated transcripts, alternate splicing isoforms, noncoding or anti-sense transcripts, monoallelic exclusions, and/or allelic variations within gene families (e.g., orthologs and paralogs), although not limited thereto.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
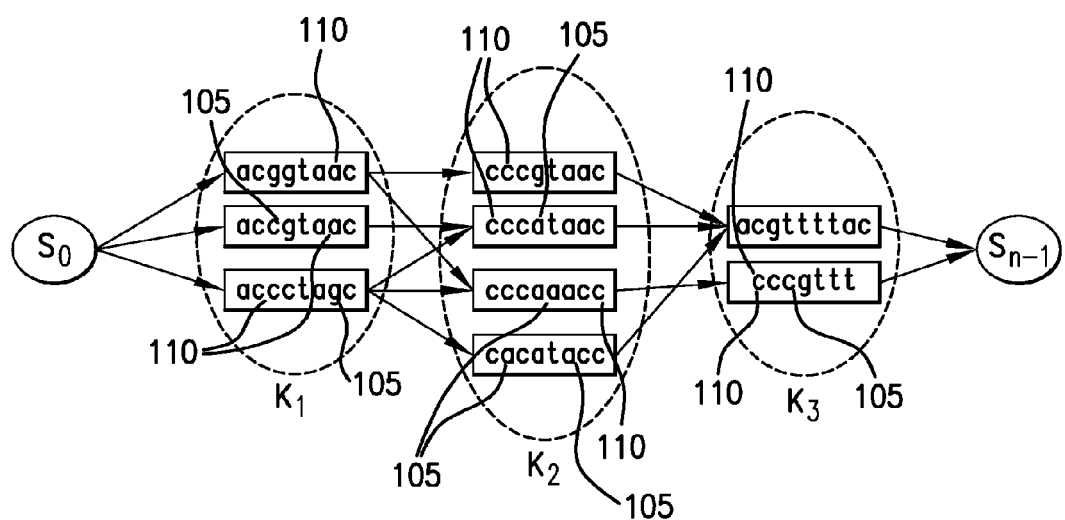
FIG. 1 is an illustration of an example of DAG of stringomes over the alphabet {a, t, c, g} having few "acct" pattern occurrences.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures, or appended claims.

DETAILED DESCRIPTION OF EXEMPLARY EMBODIMENTS

Exemplary systems, methods and computer-accessible mediums according to exemplary embodiments of the present disclosure can be used for pattern matching on hypertext. The graph can be directed and acyclic (e.g., Directed Acyclic Graph), and the nodes can be partitioned into groups whose strings are highly similar to each other, and thus can be highly compressed. Additionally, pattern occurrences can span only a constant number of nodes (e.g., at most two, as in the embodiment described herein). According to the above framework, a pattern occurrence can be either fully contained into a node-string, or it can overlap two node-strings connected by a "link" and be represented by an edge (e.g., (s', s")), thus actually matching a suffix of s' and a prefix of s". Given the structure of these occurrences, the above can be grouped as "node occurrences" and "edge occurrences".

An exemplary problem can consist of or include k groups of variable-length strings $K_1, K_2, \ldots, K_k$, providing the building blocks for the stringomes. The strings can be n in number, have a total length of N characters, and can be further linked in a pair-wise fashion by m links, defined below. Each group $K_i$ can consist of or include $n_i$ strings $\{S_{i1}, S'_{i2}, \ldots, S_{int}\}$, much similar to each other. It can be assumed that $|S_{ij}| \leq S_{max}$ and $n_i$ can be bounded from above by a small constant (e.g., $S_{max} \approx 30$ Kb, the size of a typical human haplotype block and $n_i \leq 10$, the number of different allelic forms for a haplotype block, though in principle there could be as many as $2^{max|S_{ij}|}$ alleles, only accounting for biallelic single nucleotide polymorphisms or SNP's). The indicator function, $1_{s',s''}$ can be 1, if there is a link (e.g., edge) between the pair of strings (s', s") and/or 0. It can then be $$n = \sum_{i=1}^{k} n_i, N = \sum_{i=1}^{k}\sum_{j=1}^{n_i} |s_{ij}|, \text{ and } = (n_1 + n_k) + \sum_{i=1}^{k-1}\sum_{s' \in K_i}\sum_{s'' \in K_{i+2}} 1_{s',s''}.$$

When the number of allelic forms are bounded by a small-constant, $n=O(k), m=O(k)$ and $N=O(kS_{max})$, the complexity can be strongly dependent on the number k of haplotype blocks, and the size of the haplotype blocks $S_{max}$ (e.g., genome length and linkage disequilibrium (LD-parameter)). In species such as *homo sapiens*, which have encountered a recent population bottle-neck, these parameters can be advantageous as k can be small and $s_{ij}$'s can be relatively long. Also, given the strong group-similarity, the value of N can be a pessimistic upper hound to the storage of the strings. For exemplary purposes only, the following bounds will be given in terms of the parameters N and m, resorting subsequently to the k-th order empirical entropy $H_k(K)$ of the string set $K=\cap_i K_i$ When dealing with compressed data structures. (See e.g., reference 27).

Groups of strings can be interconnected to form a multi-partite DAG where G=(V,E) defined below. The set V can consist of n+2 nodes, one node per string $S_{ij}$ plus two special nodes (e.g., $s_0$ and $s_{n+1}$), which can constitute the "source" and the "sink" of the multi-partite DAG, and can contain empty strings (in order to avoid generating spurious hits). The set E can consist of m edges which link strings of adjacent groups, which can have edges of the form $(S_{ij'}, S_{(i+1)j''})$, where $1 \leq j' \leq n_i$ and $1 \leq j'' \leq n_{i+1}$. In addition, the source $s_0$ can be connected to all strings of group $K_1$ and the sink $s_{n+1}$ can be linked from all strings in $K_k$.

FIG. 1 shows an illustration of an exemplary DAG over stringomes over the alphabet {a, t, c, g} having few accc pattern occurrences. For example, characters 105 can indicate the characters, which are different from the ones in the corresponding position in the first string of each class. Further, the characters 110 can indicate the occurrences of the pattern P=accc, indicating 1 node-occurrence and 3 edge-occurrences, and these three of last type can involve different splitting of the pattern between the two node-strings involved in the matching. The exemplary systems, methods and computer-accessible mediums can function where edges connect strings of non-adjacent classes, namely $E \subseteq K_i \times K_j$ with i<j. However, the description below will deal only with the class-adjacency assumption.

It can be important and/or beneficial to generate an index over G in order to efficiently support two basic exemplary pattern queries:

1) Counting: Given a pattern P[1, p], it can be important to count the number occ of pattern occurrences in G.
2) Reporting: Same as the previous query, but here it can be important to report the positions of these occ occurrences.

One issue can be that G encodes a multitude of strings, one per possible edge, or path in the more general case, in the DAG, such that all of them cannot be explicitly stored, facilitating the building of a classic indexing data structure (e.g., suffix tree or array (see e.g., reference 13) or an FM-index (see, e.g., references 17, 27)), as the above can result in the space growing as $\Theta(Nm)$ rather than $\Theta(N+m)$ in the worst case. For instance, when $N \approx 10^{10}$ is the number of the characters in the stringomes and $m \approx 10^7$ is the total number of links defining the architecture of the stringomes, this complexity can make such solution infeasible. In order to circumvent this problem, the exemplary systems, methods and computer-accessible mediums according to the exemplary embodiments of the present disclosure can account for the string interconnections at query time, rather than at indexing time, facilitating that this step can be performed efficiently in time and space.

Exemplary Schematics of Data Structure

To describe the schematics of a data structure that underlie the exemplary systems, methods and computer-accessible mediums, it can be beneficial to first identify the data-structural building blocks needed to answer the pattern queries, specify their general algorithmic features, and detail at least some implementations for these data structures, which can facilitate the derivation of the time/space bounds for the solutions. As an example, three exemplary implementations can be utilized, e.g., (i) addressing the I/O-issue only, (ii) addressing the compression-issue only, and (iii) combining (i) and (ii).

This exemplary approach can be motivated by the following, e.g., (i) any advancements in the algorithmic or procedural community on any one of these data-structural problems can be deployed as is to correspondingly improve previous results, and (ii) the expository structure can be simplified by distinguishing between the algorithmic solutions to the problems and their fine technical details.

Exemplary Node Occurrences $S=\$s_{11}\$s_{12}\$ \ldots \$s_{knk}\$$ can be created by concatenating all strings in set K separated by a special character $ which is assumed to not occur in the strings' alphabet, which then follows that $|S|=O(N)$. If P is a node-occurrence in G then P can occur inside some string of K, and thus, by definition of string S, the pattern P can occur in this string. The converse can also be true. Therefore, counting/reporting node-occurrences of P in G can be summarized as, e.g., counting/reporting pattern occurrences in S. Consequently a full-text index $D_K$ can be built over the string S which we can be assumed to take $s_{node}(S)$ space and $tc_{node}(S, p)$ time to count the pattern occurrences of P in S, and $tr_{node}(S, p)$ time to report the pattern occurrences in S. Error tolerant versions of this scheme can also be embodied by adopting proper error-aware indexing structures for S.

$D_K$ can be any known full-text index such as the suffix tree or the suffix array. (See e.g., reference 13). In this case, it can be $s_{node}(S)=O(N \log N)$ bits of space, $tc_{node}(S, p)=O(p+\log N)$ time to count the node occurrences, and $tr_{node}(S, p)=tc_{node}(S, p)+O(occ)$ time to report the occ node occurrences.

If N becomes larger than the internal memory M, then an external-memory index or a compressed self-index can be utilized. In the former, the String B-tree data structure can be used (see e.g., reference 11), and can take $$tc_{node}(S, p) = O\left(\frac{p}{B} + \log_B N\right) I/Os$$

and $$tr_{node}(S, p) = tc_{node}(S, p) + O\left(\frac{OCC}{B}\right) I/Os,$$

where B can be the page size of the disk-memory system used to store the index and the string S.

In case a compressed self-index is utilized, such as the FM-index (see e.g., references 10, 12), the LZ-index. (see e.g., references 18, 25), or any other of their variations or other proposals (see e.g., references 26, 27), then the counting time can be O(p), and the reporting time per occurrence can be slowed-down by a multiplicative term poly log(N)= $(\log^{1+\epsilon} N/\log \log N)$ or less depending on the implementation. Known approaches can be utilized (see e.g., references 8, 26, 27), which can be incorporated into the exemplary systems, methods and computer-accessible mediums to achieve suitable complexity bounds. The exemplary systems, methods and computer-accessible mediums according to certain exemplary embodiments of the present disclosure can imply near optimality in that, as far as the space is concerned, it can achieve close to the k-th order entropy of the indexed string collection K, (e.g., $NH_k(K)+o(N)$bits).

It is possible to object to the fact that the set K is highly homogeneous in each sub-group $K_i$, and yet the notion of entropy fails to capture this subtlety, since $H_k(s) \approx H_k(ss)$ and thus $|ss|H_k(ss)=2|s|H_k(s)$, and might mistakenly conclude that compressed indexes fail to take full advantage of the structure of K. However, it can be observed that the aforementioned space bounds can be upper bounds for the FM-index and the LZ-index. In practice, e.g., those indexes can achieve almost the same space for s and ss, as one can easily verify this claim by running bzip or gzip. In any case, if an achievement of improved upper bounds in the space usage is desired, then it is possible to utilize the newly determined/obtained family of self-indexes that can be well-suited to the repetitive sequence collection setting, (see e.g., reference 19), where space occupancy depends only on the length of the base sequence (e.g., one of the strings in each group) and the number of variations in its repeated copies. In this manner, the space reduction factor would likely be no longer constant, and dependent on the entropy of the underlying collection, and now can depend on N/n.

It is possible to combine both I/O-efficiency and succinct-space occupancy in fill-text indexing. Exemplary results can achieve O(N) bits of storage (here a $\sigma$=O(1)) and supported pattern searches either in $O(p/(B \log N)+(\log^4 N)/\log \log N+occ \log_B N)$ I/Os [6] or in $O(p/B+\sqrt{n/B} \log n+occ/B)$ I/Os [14]. These can be based on a combination of geometric ideas and compressed full-text principles called Geometric BWT. (See e.g., reference 15).

Exemplary Edge Occurrences, $1^{st}$ Exemplary Solution

The exemplary systems, methods and computer-accessible mediums can facilitate an efficient count/report the occurrences of P, which can overlap the two strings at the extremes of a graph edge, say (s's"), with such a pattern occurrence overlapping a suffix of s' and a prefix of s".

One exemplary solution can include a reduction of this problem to a substring search problem in order to resort to a full-text index. A string $S_E$ can be built which can be obtained by concatenating m substrings, which can be obtained turning each edge e=(s',s") into the substring $s_e$=s'$s"$$. String $S_E$ can have length O(mN) in the worst case. This way, every pattern search can boil down to executing p–1 searches for patterns $P_i'$=P[1,i]$P[i+1,p] for i=1, 2, . . . , p–1. The counted/reported occurrences can be only the edge-occurrences because the presence of the special symbol $ can prevent returning node-occurrences, which are internal in some string of K. Whereas, the presence of a double $$ between two strings generated by edges in G can ensure that an edge-occurrence can occur only inside some $s_e$. The advantage of this exemplary solution can be to deploy known results in the compressed full-text index setting; however a large space occupancy can be needed, exacerbated by the replication of each string as many times as the number of incident edges in E, and the slowdown in the query performance by a multiplicative factor p (e.g., the pattern's length), due to the searches for the $P_i$'s. In practice, the replication of the K's strings may not be a problem if proper compressed data structures are used.

This exemplary approach can take $s_{node}(S_E)$ space and $O(p \times tc_{node}(S_E,p))$ time to count the edge occurrences in G, and $O(p \times tr_{node}(SE,p))$ time to report these edge occurrences.

Figure 3:
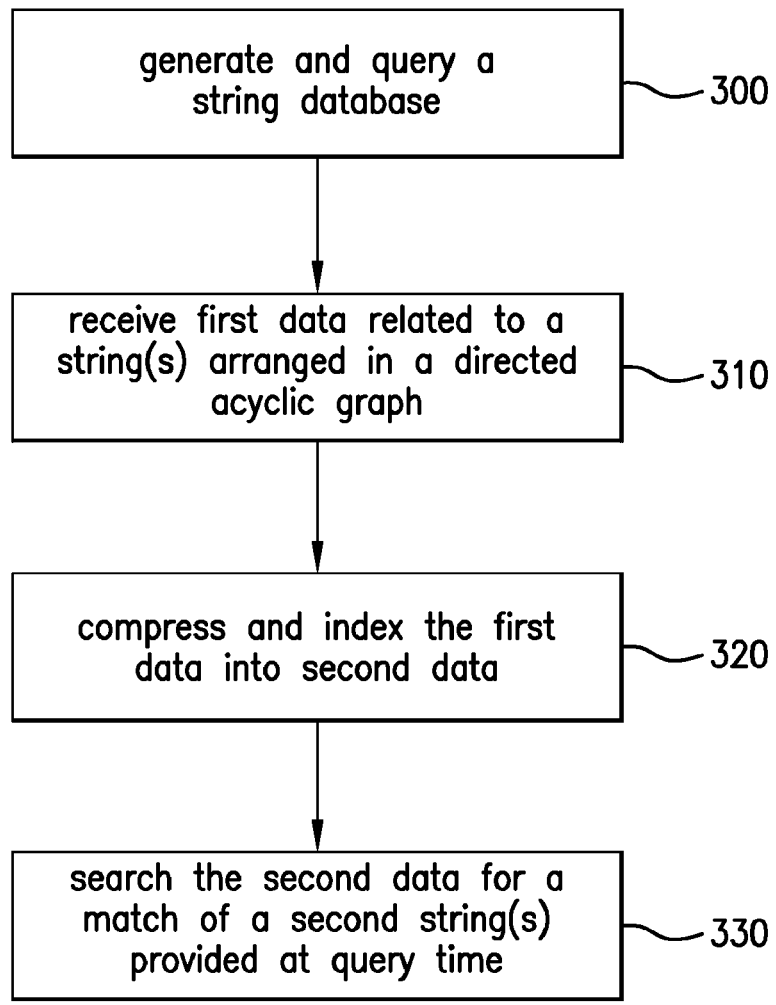
FIG. 3 is a flow diagram of an exemplary method in accordance with certain exemplary embodiments of the present disclosure.

According to exemplary embodiments of the present disclosure, as shown in FIG. 3, it is possible to provide exemplary systems, methods and computer accessible mediums that can generate and query a string database (procedure 300), and can receive first data related to a string(s) arranged in a directed acyclic graph (procedure 310), compress and index the first data into second data (procedure 320), and search the second data for a match of a second string(s) provided at query time (procedure 330).

Given the reduction to full-text indexing, it is possible to utilize the exemplary node occurrences, and observe that the string $S_E$ can be even more repetitive than S and possibly much longer. The space occupancy can be close to $|S_E|H_k(S_E)$ bits, if a compressed self-index is used, whereas the time efficiency for counting the edge occurrences can be $O(p^2)$ time, with an extra additive term of O(occ×poly log(Nm))=O(occ×poly log(N)) time to report these occurrences. The exemplary systems, methods and computer-accessible mediums according to certain exemplary embodiments of the present disclosure can have certain exemplary features, e.g., the simplicity in the way the compressed indexes are reused to search for both node- and edge-occurrences, which can impact the re-use of known software libraries (see e.g., reference 10), as well as the ease with which it can be parallelized given that the p searches can be executed independently of one another. In addition, the space utilization may not be easily controlled and might grow explosively because of the necessity to explicitly create $S_E$ before building the compressed index. Therefore, external-memory procedures can be used to generate the compressed full-text indexes. (See e.g., reference 9).

Exemplary Edge Occurrences, $2^{nd}$ Exemplary Solution

In order to avoid the replication of K's strings, it cart be beneficial to use a small space per edge, namely space independent of the strings' length. This exemplary solution can reduce the edge-occurrence problem into a range-query problem over a set of m 2d-points, each one being in bijective correspondence with an edge of G. Two sorted sets of strings can be introduced, where F can be the set of strings in K sorted alphabetically and B can be the set of the reversal of the strings in K, also sorted alphabetically. Each string $s_{ij}$ in K can be assigned two ranks. The forward rank fr[ij], which can indicate its lexicographic position in F, and the backward rank br[ij], which can indicate the lexicographic position of its reversal in B. The simple key property that can be exploited is that given a sorted set of strings, the ones prefixed by a given string occupy a contiguous range of positions. This property can be instantiated in the following examples, given the pattern P[1,p] and an integer I, on the two sets F and B:

the set of strings in F prefixed by P[i+1,p] occupy a contiguous range of forward-ranks, (e.g., [fw$_{start}$(P[i+1,p]),fw$_{end}$(P[i+1,p])]);

the set of strings in B prefixed by (P[1,i])$^R$ occupy a contiguous range of backward-ranks, (e.g., [bw$_{start}$(P[1,i]), bw$_{end}$(P[1,i])]).

Further, the edge-occurrence of P at the edge $s_{ij}, s_{(i+1)j'}$ can be decomposed as a double match. One can involve a pattern prefix P[1,x] and a suffix of $s_{ij}$, and the other can involve the remaining pattern suffix P[x+1,p] and a prefix of $s_{(i+1)j'}$. As a result, the edge occurrences can be partitioned into p classes, (e.g., $P_1 \cap \ldots \cap P_p$) where the class Px can contain for example, all edges for which the matching pattern-prefix has length x.

When one of the edges in Px, say (s's") is considered, then by definition s' can have suffix P[1,x] and s" can have prefix P[x+1,p]; consequently, s' can have backward-rank in the sorted set B within the range [bw$_{start}$(P[1,x]),bw$_{end}$(P[1,x])], and s" can have forward-rank in the sorted set F within the range [fw$_{start}$(P[x+1,p]), fw$_{end}$(P[x+1,p])]. As a result for example, all edge-occurrences Px can be achieved relative to the "string-pair" by just searching for all edges in G that satisfy both properties above. In order to solve this problem efficiently, an algorithmic transformation can be utilized that maps the set E of m edges of G into a set P of in 2d-points, where each edge $(s_{ij}, s_{(i+1)j'})$ can map into the 2d-point (bw$_{start}$[I,j],fw[(i+1)j']).

With this exemplary transformation, solving an edge-occurrence query can be referred to as, e.g., a two-steps process. First step can be a prefix search, where for each prefix/suffix pair in P, namely <P[1,x],P[x+1,p]>, the range of strings can be searched in F prefixed by P[x+1,p] and the range of reversed strings in B prefixed by (P[1,x])$^R$. The two string ranges can be denoted by the ranges of forward/backward ranks delimited by that pair of strings (e.g., [fw$_{start}$(P[x+1,p]),fw$_{end}$(P[x+1,p])] and [bw$_{start}$(P[1,x]), bw$_{end}$(P[1,x])]). The second step can be a geometric search, where 2d-range query can be solved over the set P defined by [bw$_{start}$(P[1,x]),bw$_{end}$(P[1,x])]×(fw$_{start}$(P[x+1,p]),fw$_{end}$(P[x+1,p])]. The counted/reported 2d-points in P can be just the ones corresponding to the edges in G that identify an edge-occurrence, according to the way the set P is built and the geometric query is defined.

Overall, the time cost to answer an edge-occurrence query can be explained as p times the cost of a prefix-search over a set of in strings plus a range-query over a set of m 2d-points. Thus, the exemplary systems, methods and computer-accessible mediums according to exemplary embodiments of the present disclosure can break the dependency on mN.

During the implementation of the prefix-search step, the one beneficial way to solve the prefix-search problem over F and B can be to build two compacted tries, one per set, taking O(n log N+N) bits of storage (recall that |F|=|B|=n). The time to prefix-search for a string Q[1,q] can be O(q). This implementation can be highly efficient if space is not an issue and everything fits in internal memory, otherwise the I/O-cost can be Θ(q), and this can be unacceptable given that the prefix-search must be repeated p times, thus inducing eventually Θ(p²) I/Os.

If I/O is a primary concern, then it is possible to re-use the String B-tree data structure (see e.g.; reference 11) storing the string set F and B, and taking $$O\left(\frac{q}{B} + \log_B n\right)$$

I/Os to identify the range of prefix-suffix occurrences.

If space is a primary concern, even though everything can fit in the internal memory, then the compressed self-index storing K and supporting node-occurrence searches can be reused, and take $t_{retrieve}(q)=O(q+poly\ log(N))$ time to retrieve any prefix/suffix of some string of K. Then, the Patricia Tries data structure can be built, and the blind search procedure can be adopted (see e.g., reference 11) to fast search for the prefix-suffix ranges in F and B. The choice of the Patricia Tries, rather than the classic tries, can offer two exemplary advantages:

a first, the space taken by Patricia Tries can be proportional to the number of indexed strings rather than their total length, given that they store just one integer per node and one character per edge; the strings being already stored in the indexing data structure for K. This way the space usage can be O(n log N) bits rather than O(n log N+N) (the indexed strings can be retrieved from the compressed self-index).

a second, the prefix search can be implemented in O(q+ $t_{retrieve}$(q)) time and can need to access one single strings of F or B, rather than the previous O(q) accesses to strings (because of the O(q) edge traversals), which actually translate to Θ(q) cache misses.

The two Patricia Tries can be denoted by $T_K$, and can occupy O(n log N) bits of space and support a prefix/suffix search for a pattern Q[1,q] in $O(q+t_{retrieve(q))=O(q+poly\ log(N))}$ time.

If I/Os and space are a concern, then a mixed solution can be adopted that deploys the String B-tree to index a sample of F and B, and a classic compressor to store the strings in these two sets in a blocked fashion. Each set (either F or B can be scanned) in lexicographic order, and the strings can be compressed one after the other until the compressed block has size Θ(B). This process can continue to form at most O(N/B) blocks, possibly much less because of the compressibility of the sets $K_i$ and the sorted order in which F and B are scanned. These blocks can be O(n/B) because of the O(1) length of the indexedicompressed strings. Given this compressed blocking, the first string of each block can be indexed in a String B-tree thus taking O(n/B) overall space. Searching for the prefix/suffix range in F and B can take O(q/B+log$_B$(n/B))=O(q/B+log$_B$n) I/Os. The data structures can be denoted by $T_K$, the data structure used to index F and B, and by $t_{range}$(q,K), and the time complexity of determining the prefix/suffix ranges in F and B.

To implement the exemplary geometric-search step, it is possible to build a succinct data structure for 2d-range queries over the set of points P. One implementation for this data structure can be the classic Range Tree which can take O(m log m) space and O(log m) query time, since |P|=m. Counting time can be improved to, e.g., $$O\left(\frac{\log m}{\log \log m}\right),$$

and space to O(m). (See e.g., reference 16). Reporting can be sped up to O(log log m) time with taking O(m $\log^c$ m) space (for any c>0), since the 2d-points can have integer coordinates within a bounded space. (See e.g., reference 4). Space can be further reduced by taking into account the statistical distribution of the points. (See e.g., reference 7).

In case I/Os are a primary concern, an external-memory version of the Range-Tree can be employed (see e.g., references 2, 5), thus utilizing O((m/B)(log m/log $\log_B$ m)) disk pages and answer range queries with O($\log_B$ m+occ/B) I/Os (in the case of counting, set occ=0). There can also exist a number of linear space solutions for 2d-range queries based on kd-trees, but with an inferior I/O-complexity.

Compression may not be a primary issue because it is generally not known a priori the statistical distribution of the points (e.g., strings) and it can be assumed that m»N. The exemplary systems, methods and computer-accessible mediums can make it agnostic to the best available data structure for 2D-range reporting/counting, thus making it mainly a black-box tool for the exemplary solution. Thus, it can be economically exploited by the exemplary systems, methods and computer-accessible mediums to improve all bounds.

It is possible to denote by $P_K$ the data structure used to answer the 2d-range queries, and write $t_{count}(P)$ to denote the time cost of counting the number of points falling into a 2d-range, and write $t_{report}(P)$ to denote the time cost of reporting the points falling into 2d-range.

Exemplary Theorem 1

For I/O efficiency, the following exemplary implementation of the String B-tree for $D_K$ and for $T_K$, the external-memory Range-Tree for $P_K$ can be used, which can use O(N/B+(m/B)(log m/log $\log_B$ m)) disk pages, and which can be safely assumed to be O(N/B), hence O(N log N) bits of space. For compressed space, an implementation of the FM-index for $D_K$, two Patricia Tries for $T_K$, and the Range-Tree for $P_K$ can be used, which can use $NH_k(K)$+o(N)+n log N+m $\log^2$ m bits of space. For I/O plus compression, an implementation of the Geometric BWT for $D_K$, the String B-tree for $T_K$, a blocked compression scheme for the strings in K, and an external-memory Range-Tree for $P_K$, can be used, which can use O(N+m log m) bits of space.

Exemplary Response(s) to Pattern Queries

The original counting and reporting queries can be implemented for a generic pattern P[1,p] over the string-graph G, and can be the most prominent query. The counting of the node-occurrences can be done by querying the data structure $D_K$, in $t_{count}(p)$ time, which can be the time cost of counting the pattern occurrences in the string set K, ignoring the existence of the DAG. The counting of the edge-occurrences, in accordance with one exemplary solution, can require computing the prefix-suffix Matches for all "string-pair" <P[1,x],P[x+1,p]> by deploying the data structure $T_K$ and then executing the 2d-range queries on the identified p ranges of forward/backward ranks, and summing their countings. This process can take O(p×($t_{range}$(p,K)+$t_{count}$(P)) time. This time complexity can be improved by taking advantage of better self-indexes or the fact that the prefix/suffixes being searched for are prefixes/suffixes of the same string P. Parallelizing the p searches can also be utilized.

Exemplary Theorem 2

By deploying the exemplary implementations described herein for Exemplary Theorem 1, the following performance bounds can be guaranteed. In I/O-efficiency, the String B-tree can be implemented for $D_K$ and for $T_K$, and the external-memory Range-Tree can be implemented for $P_K$. This implementation can use O(p(p/B+$\log_B$ n+$\log_B$ m)+$\log_B$ N) I/Os, which can be safely assumed to be O(p $\log_B$ m+$\log_B$ N) I/Os because reasonably p<B and n<m. In Compressed space, the FM-index can be implemented for $D_K$, two Patricia Tries can be implemented for $T_K$, and the Range-Tree can be implemented for $P_K$. These implementations can use O(p(p+poly log(N))) time. In I/O plus compression, the Geometric BWT can be implemented for $D_K$, the String B-tree can be implemented for $T_K$, a blocked compression scheme can be implemented for the strings in K, and an external-memory Range-Tree can be implemented for $P_K$. This implementation can O(p(p/B+$\log_B$ n+$\log_B$ m)+poly log(N)))=O(p $\log_B$ m+poly log(N))) I/Os, because reasonably p<B and n<m.

Exemplary Query

With the graph G and the strings K, e.g., there can be a taxonomy C of classes to which the strings in K can belong to. In reality (e.g., in genetic contexts), each string s can be further assumed to belong to at most one class (leaf) cl(s) of C and, assuming identity by descent (IBD), it can then belong to all ancestors of that leaf in C. C can be represented by a tree of arbitrary fan-out. In practice, one expects a small fan-out 2), and thus O(n) in size. More precisely the number of leaves can be stated as ≤$max_i$ $n_i$.

For the sake of exposition, an additional simplifying assumption can be introduced, constraining edges of G and classes of C. Namely that for each edge (s', s") in E the strings, s' and s" belong to the same class in C. This constraint can simplify the description.

The query over the pattern P can still be a counting/reporting query but with an additional constraint, e.g., that the counting/reporting can be restricted to the strings of K which can descend from a given class cl in C. The queried cl can be any node of C, even internal. In the light of this query, the previous additional constraint can be easily explained, as it can ensure that either cl includes both strings of an edge-occurrence, or it does not, in which case the edge-occurrence is dropped from the retrieval. The case in which the strings (e.g., two strings) of an edge belong to two different classes could introduce the cumbersome situation in which one string descends from cl but not the other. Thus, to be an edge-occurrence, cl can be an ancestor of the classes of s' and s". This preference appears to be stringent, but can be managed as detailed below. For expository reasons, the simpler formulation can be used where there is just one class per edge.

To provide results for this query, the additional constraint can be modeled by cl, and can be dealt with by adding one additional dimension onto the geometric mapping which can range over the 3d-space ($N^3$) rather than the 2d-space ($N^2$). It is possible to map every edge into a 3d-point (rather than a 2d-point), and to correspondingly map every pattern-class query into a 3d-range query (rather than a 2d-range query). This 3d-mapping can be implemented by performing a Depth-First visit of C during which, at each class u∈C, the pre-post numbers pre(u), post(u) can be attached which are computed during that visit. It is well-known that these two numbers satisfy a useful property that any descendant of u in C can be assigned a range which can be included in [pre(u),post(u)] and conversely, any ancestor of u in C can be assigned a range that can include [pre(u),post(u)].

Each edge ($s_{ij}$,$s_{(i,1)j'}$) can then be mapped into a 3d-point (bw[ij],fw[(i+1)j'],pre(c)), where c is the class of C to which both strings of that edge can belong. Post(c)=pre(c)+1 could also be interchangeably used because c is a leaf of C. The exemplary set P can still consist of m points, which can now map into a 3d-space ($N^3$). On this a data structure can be built that can efficiently solve counting-reporting queries over 3d-ranges. This exemplary data structure can be an extension of the ones used in the 2d-case with a slight slowdown in the query time and small increase in the space usage. Indeed, the cost of adding the 3d-coordinate is just a multiplicative factor O(log m.) in the query time and space complexity in internal memory, which can become O($\log_B$ m+occ/B) I/Os and O((m/B)(log m/log log B m)$^3$) disk pages in external memory. (See e.g., reference 5).

It can be beneficial to indicate how to turn a pattern-class query <P, cl> into a 3d-range query in order to correctly count the edge-occurrences; reporting can follow easily. As performed above, P's query can be mapped into a 2d-range query, and the third constraint can be added on the class cl by including the range [pre(cl), post(cl)] as the range in the third dimension of the query. The points of P which belong to this 3d-range can denote the edge-occurrences whose strings descend from class cl (recall the nesting property of the pre-post ranges assigned by the DFS-visit).

With respect to the node-occurrences, a different exemplary solution can be provided with respect to the exemplary solution introduced above. The exemplary problem can be that the pattern occurrences can be reported without any order such that the ones which belong to strings in cl cannot be quickly selected. The exemplary systems, methods and computer-accessible mediums according to an exemplary embodiment of the present disclosure can indicate (e.g., write down) the strings of K in the order of the leaves of C, to which they belong, and with some special end-markers separating them (e.g., by the character $). In this exemplary way, for any class cl, the strings that belong to cl can be contiguous in that ordering. This can be called ordered string S, which can have a size N. Then, e.g., ordered string S can be indexed via the data structure introduced (see e.g., reference 28), which can solve the so called restricted-positional text indexing problem. Namely, given a pattern P, and a range of positions (a, b), report/count all occurrences of P in S[a, b]. This way, given a counting/reporting query on P, and the class cl, a constrained-positional query can be issued on P and the range of positions which include the leftmost and the rightmost strings constrained to descend from cl. To store this pair of positions, e.g., it can be enough to keep two integers per C's node, thus requiring O(n) space overall. The only problem here can be that at present the restricted-positional indexes known are not yet compressed, and thus can take space O(N log$^∈$N) bits, and answer the queries in. O(p+occ) time. For example, this can be a sort of quasi-compressed solution because of the sub-linearity in the number of words N, which would otherwise occupy Θ(N log N) bits.

Exemplary Theorem 3

By deploying the FM-index for $D_K$, two Patricia Tries for $T_K$, the 3d Range-Tree for $P_K$, and restricted-positional text index over S, a solution can be achieved which occupies N($H_k$(K)+log$^∈$N)+m log$^3$ m bits of space and uses O(p(p+ poly log(N))) time to answer the pattern-class restricted queries. A further exemplary approach can be used which can scale appropriately with larger values of N, and thus can operate appropriately in external memory. Such exemplary approach can include, e.g., turning all node-occurrences of G into edge-occurrences; splitting every string s∈K into pieces such that their length is surely shorter than a queried pattern. All these pieces can be linked up in G. The number of edges can now become m+N/$p_{min}$, with $p_{min}$ as a lower-bound on the length of the queried patterns. Such splitting can ensure that no node-occurrence cases will occur, since patterns are longer than $p_{min}$. As a result, the exemplary systems, methods and computer-accessible mediums can count edge-occurrences only, and can also apply the previous 3D-mapping which can still deploy compressed indexes to store the strings of K and the two tries of $T_K$. The most space can, e.g., be taken by the geometric data structure which answers the 3d-range queries and now indexes Θ(m+ N/$p_{min}$) points (edges). Hence, the space is likely not only dependent on $H_k$(K) for the part of the data structure $T_K$, but also on that term which grows linearly with the length of the strings in K. However, in practice, it can be expected that $p_{min}$>30 such that 1/$p_{min}$<$H_k$(K) can make the geometric data structure not much larger.

Exemplary Theorem 4

D can be set to Θ(m+N/$p_{min}$). By deploying the String B-tree for $T_K$ and the 3d Range-Tree for $P_K$, an external-memory solution can be achieved which occupies O(N/B+ (d/B)(log d/log $\log_B$ d)$^3$)) disk pages and O(p(p/B+$\log_B$ n+$\log_B$ d))=O(p $\log_B$ d) I/Os to answer the pattern-class restricted queries, given that reasonably p<B and n<d. For example, the space can be reduced to have the form O(d/B (log d/log $\log_B$ d)$^2$)) but the I/Os of a multiplicative factor O(log m/log $\log_B$ in) can be increased.

Exemplary Conclusions

The exemplary systems, methods and computer-accessible mediums according to exemplary embodiments of the present disclosure can be uncomplicated, and yet efficient in space and time, such that they can be implemented by using known geometric and string-matching libraries (e.g., LEDA and PizzaChili). The exemplary systems, methods and computer-accessible mediums can have immediate applications to next-generation sequencing technologies, base-calling, variant-calling, expression analysis, population studies and onco-genomics.

Figure 2:
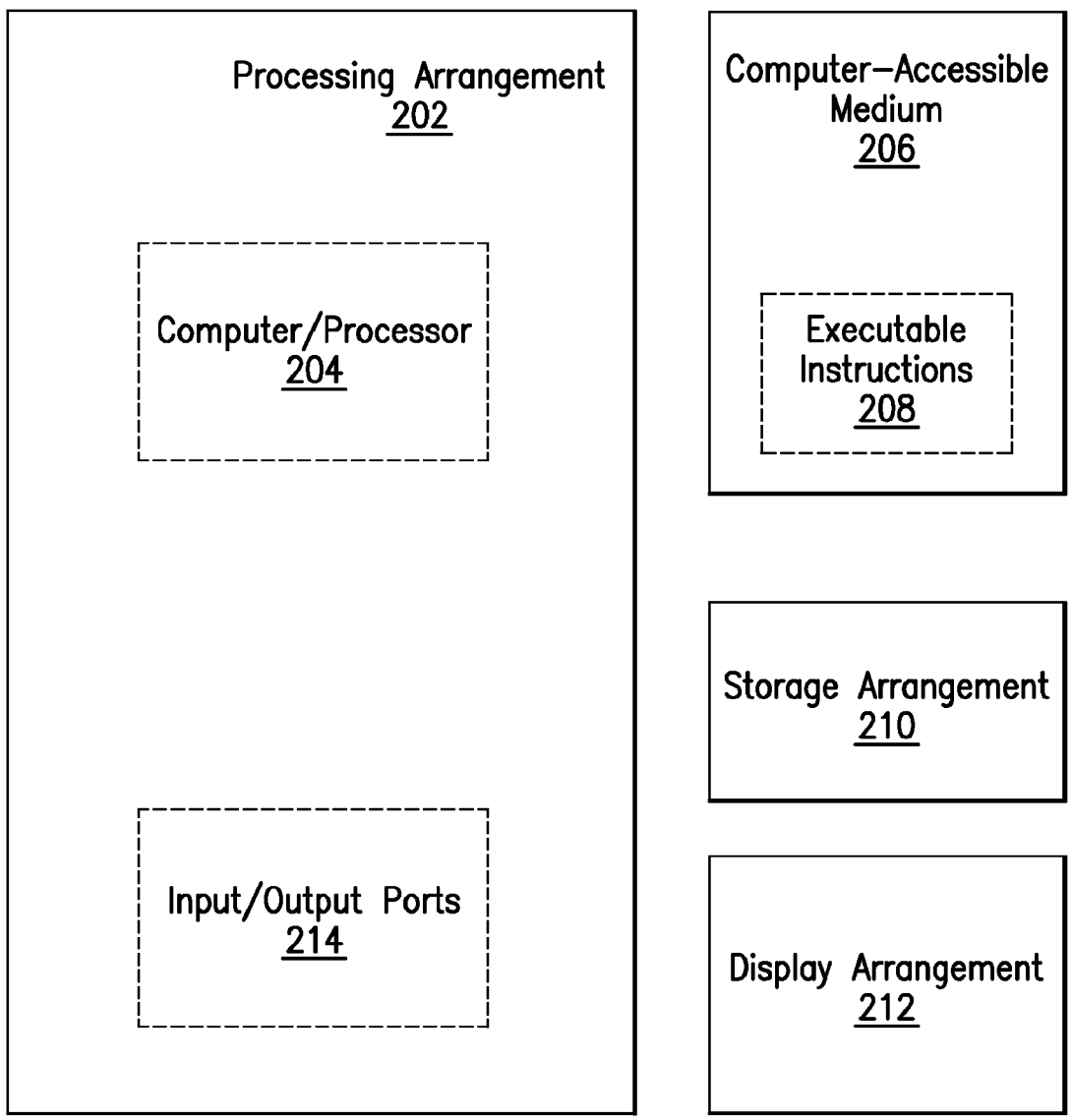
FIG. 2 is an exemplary block diagram of an exemplary system in accordance with certain exemplary embodiments of the present disclosure.

FIG. 2 shows a block diagram of an exemplary embodiment of a system according to the present disclosure. For example, exemplary procedures in accordance with the present disclosure described herein can be performed by a processing arrangement and/or a computing arrangement 202. Such processing/computing arrangement 202 can be, e.g., entirely or a part of or include, but not limited to, a computer/processor 204 that can include, e.g., one or more microprocessors, and use instructions stored on a computer-accessible medium (e.g., RAM, ROM, hard drive, solid-state disks, or other storage device).

As shown in FIG. 2, e.g., a computer-accessible medium 206 (e.g., as described herein above, a storage device such as a hard disk, floppy disk, memory stick, solid-state disks, a mix of SSD and HD, CD-ROM, RAM, ROM, etc., or a collection thereof) can be provided (e.g., in communication with the processing arrangement 202). The computer-accessible medium 206 can contain executable instructions 208 thereon. In addition or alternatively, a storage arrangement 210 can be provided separately from the computer-accessible medium 206, which can provide the instructions to the processing arrangement 202 so as to configure the processing arrangement to execute certain exemplary procedures, processes and methods, as described herein above, for example.

Further, the exemplary processing arrangement 202 can be provided with or include an input/output arrangement 214, which can include, e.g., a wired network, a wireless network, the internet, an intranet, a data collection probe, a sensor, etc. As shown in FIG. 2, the exemplary processing arrangement 202 can be in communication with an exemplary display arrangement 212, which, according to certain exemplary embodiments of the present disclosure, can be a touch-screen configured for inputting information to the processing arrangement in addition to outputting information from the processing arrangement, for example. Further, the exemplary display 212 and/or a storage arrangement 210 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] N. L. A. Amir, M. Lewenstein. Pattern matching in hypertext. In *Proc. WADS, Lecture Notes in Computer Science*, Vol. 1272, pages 160-173, 1997.

[2] P. Afshani, L. Arge, and K. Larsen. Orthogonal range reporting in three and higher dimensions. In *IEEE FOCS*, pages 149-158, 2009.

[3] T. Akutsu. A linear time pattern matching algorithm between a string and a tree. In *Proc. CPM*, Lecture Notes in Computer Science, Vol. 1272, pages 1-10, 1993.

[4] S. Alstrup, G. S. Brodal, and T. Rauhe. New data structures for orthogonal range searching. In *Proc. FOCS*, pages 198-207, 2000.

[5] L. Arge and K. G. Larsen. I/o-efficient spatial data structures for range queries. *SIGSPATIAL Special*, 4(2):2-7, 2012.

[6] Y.-F. Chien, W.-K. Hon, R. Shah, and J. S. Vitter. Geometric burrows-wheeler transform: Linking range searching and text indexing. In *Procs of the Data Compression Conference (DCC)*, pages 252-261. IEEE Computer Society, 2008.

[7] A. Farzan, T. Gagie, and G. Navarro. Entropy-bounded representation of point grids. In *Proc. ISAAC*, volume 6507 of *Lecture Notes in Computer Science*, pages 327-338, 2010.

[8] P. Ferragina. *Handbook of Computational Molecular Biology*, chapter Chap. 35: String search in external memory: algorithms and data structures. Chapman & Hall/CRC Computer and Information Science Series, 2005.

[9] P. Ferragina, T. Gagie, and G. Manzini. Lightweight data indexing, and compression in external memory. *Algorithmica*, 63(3):707-730, 2012.

[10] P. Ferragina, R. Gonzalez, G. Navarro, and R. Venturini. Compressed text indexes: From theory to practice. *ACM Journal of Experimental Algorithinics*, 13, 2008.

[11] P. Ferragina and R. Grossi. The string B-tree: A new data structure for string search in external memory and its applications. *Journal of the ACM*, 46(2):236-280, 1999.

[12] P. Ferragina and G. Manzini. Indexing compressed text. *Journal of the ACM*, 52(4):552-581, 2005.

[13] D. Gusfield. *Algorithms on Strings, Trees, and Sequences—Computer Science and Computational Biology*. Cambridge University Press, 1997.

[14] W.-K. Hon, R. Shah, S. V. Thankachan, and J. S. Vitter. On entropy-compressed text indexing in external memory. In *Procs of the SYmposium on String Processing and Information Retrieval (SPIRE)*, volume 5721 of *Lecture Notes in Computer Science*, pages 75-89. Springer, 2009.

[15] W.-K. Hon, R. Shah, and J. S. Vitter. Compression, indexing, and retrieval for massive string data. In *Procs of Symposium on Combinatorial Pattern MAtching (CPM)*, volume 6129 of Lecture Notes in Computer Science, pages 260-274. Springer, 2010.

[16] J. JáJá, C. W. Mortensen, and Q. Shi. Space-efficient and fast algorithms for multidimensional dominance reporting and counting. In Proc. ISAAC, volume 3341 of *Lecture Notes in Computer Science*, pages 558-568, 2004.

[17] D. K. K. Park. String matching in hypertext. In *Proc. CPM*, Lecture Notes in Computer Science, Vol. 937, pages 318-329, 1995.

[18] S. Kreft and G. Navarro. Self-indexing based on lz77. In *Proc. CPM*, volume 6661 of *Lecture Notes in Computer Science*, pages 41-54, 2011.

[19] V. Mäkinen, G. Navarro, J. Sirén, and N. Valimaki. Storage and retrieval of individual genomes. In *Proc. RECOMB*, volume 5541 of *Lecture Notes in Computer Science*, pages 121-137, 2009.

[20] U. Manber and S. Wu. Approximate string matching with arbitrary costs for text and hypertext. In *Proc. IAPR Workshop on Structural and Syntactic Pattern Recognition*, pages 22-33, 1992.

[21] F. Menges, G. Narzisi, and B. Mishra. TotalRecaller: improved accuracy and performance via integrated alignment and base-calling. *Bioinformatics*, 27(17):2330-2337, 2011.

[22] B. Mishra. The genome question: Moore vs. jevons. *Jnl. of Computing of the Computer Society of India*, 2012.

[23] G. Navarro. Improved approximate pattern matching on hypertext. In *Proc. LATIN*, Lecture Notes in Computer Science, Vol. 1380, pages 352-357, 1998.

[24] G. Navarro. Improved approximate pattern matching on hypertext. *Theoretical Computer Science*, 237(1-2):455-463, 2000.

[25] G. Navarro. Implementing the lz-index: Theory versus practice. *ACM Journal of Experimental Algorithmics*, 13, 2008.

[26] G. Navarro. Wavelet trees for all. In Proc. *of the Symposium on Combinatorial Pattern Matching (CPM)*, volume 7354 of *Lecture Notes in Computer Science*, pages 2-26. Springer, 2012.

[27] G. Navarro and V. Mäkinen. Compressed full-text indexes. *ACM Computing Surveys*, 39(1), 2007.

[28] C.-C. Yu, B.-F. Wang, and C.-C. Kuo. Efficient indexes for the positional pattern matching problem and two related problems over small alphabets. In *Proc. ISAAC*, volume 6507 of *Lecture Notes in Computer Science*, pages 13-24, 2010.

What is claimed is:

1. A non-transitory computer-accessible medium having stored thereon computer-executable instructions for at least one of generating or querying a string database, wherein, when a computer hardware arrangement executes the instructions, the computer arrangement is configured to perform procedures comprising:
  receiving first data related to at least one input first string, the at least one input first string comprising a plurality of substrings;
  generating second data related to a directed acyclic graph (DAG) based on the first data, wherein each node of the DAG corresponds to at least one of the substrings, and at least one edge of the DAG encodes instructions for concatenating the substrings;
  generating a full-text index based on the at least one input first string;
  searching the full-text index for a match to at least one second string; and
  at least one of:
  (i) counting pattern occurrences in the full-text index, or
  (ii) counting the pattern occurrences by combining a plurality of further substrings into at least one third string with a particular delimiter character separating each of the substrings.

2. The computer-accessible medium of claim 1, wherein the instructions are encoded using a one-to-one mapping between the at least one first input string and a further input string.

3. The computer-accessible medium of claim 2, wherein the at least one first input string is formed by concatenating the substrings according to each directed path in the DAG.

4. The computer-accessible medium of claim 1, wherein the DAG is a multi-partite graph corresponding to partitions of the substrings.

5. The computer-accessible medium of claim 1, wherein the computer hardware arrangement is further configured to at least one of (i) count edge occurrences by turning each edge into a substring and inserting special delimiter characters between each substring, (ii) count edge occurrences using range-query procedure, or (iii) turn or convert each edge occurrence into a two-dimensional point in a Euclidean space based on sorting of substrings.

6. The computer-accessible medium of claim 5, wherein the substrings are at least one of normal or reversed.

7. The computer-accessible medium of claim 1, wherein the at least one first input string is a representation of at least one of (i) at least one haplotype block, and the at least one edge encodes haplotype phasing, (ii) exons, and the at least one edge encodes splice junctions, (iii) amplicon and/or delicon in at least one heterogeneous cancer genome, and the at least one edge encodes a break-point in the at least one heterogeneous cancer genome, or (iv) at least one portion of at least one document.

8. The computer-accessible medium of claim 7, wherein the at least one portion is at least one of a chapter, a paragraph or a sentence, and the at least one edge represents different versions of the at least one document.

9. The computer-accessible medium of claim 7, wherein the at least one first input string has a variable length.

10. The computer-accessible medium of claim 7, wherein the DAG is a multipartite graph, and parts of the multipartite graph correspond to different versions of the at least one portion of the at least one document.

11. The computer-accessible medium of claim 1, wherein the computer hardware arrangement is further configured to (i) generate a geometric index based on the DAG, (ii) solve two-dimensional range queries based on the geometric index, or (iii) compress the DAG.

12. The computer-accessible medium of claim 1, wherein the substrings are indexed by at least one self-indexing structure which is at least one of a Ferragina-Manzini index, a Lempel-Ziv index or a further index.

13. The computer-accessible medium of claim 1, wherein the nodes are labeled by at least one of numerical weights, additional strings, a name, a category or an ontological information.

14. The computer-accessible medium of claim 13, wherein at least one of the category or the ontological information is represented by a tree whose nodes are numbered according to a pre-order visit.

15. The computer-accessible medium of claim 13, wherein each edge occurrence is represented as a three-dimensional point derived from topologies of the DAG and the ontological information.

16. The computer-accessible medium of claim 1, wherein the computer hardware arrangement is further configured to (i) count edge occurrences using a geometric data structure supporting three-dimensional range queries, or (ii) turn each node occurrence into an edge occurrence by turning each string into a path of shorter strings of particular lengths.

17. A method for at least one of generating or querying a string database, comprising:
  receiving first data related to at least one input string, the at least one input string comprising a plurality of substrings;
  using a computer hardware arrangement, generating second data related to a directed acyclic graph (DAG) based on the first data;
  wherein each node of the DAG corresponds to at least one of the substrings, and at least one edge of the DAG encodes instructions for concatenating the substrings;
  generating a full-text index based on the at least one input first string;
  searching the full-text index for a match to at least one second string; and
  at least one of:
  (i) counting pattern occurrences in the full-text index, or
  (ii) counting the pattern occurrences by combining a plurality of further substrings into at least one third string with a particular delimiter character separating each of the substrings.

18. A system for at least one of generating or querying a string database, comprising:
  a hardware processing arrangement configured to:
    receive first data related to at least one input string, the at least one input string comprising a plurality of substrings;
    generate second data related to a directed acyclic graph (DAG) based on the first data, wherein each node of the DAG corresponds to at least one of the substrings, and at least one edge of the DAG encodes instructions for concatenating the substrings;
    generate a full-text index based on the at least one input first string;
    search the full-text index for a match to at least one second string; and
    at least one of:
    (i) count pattern occurrences in the full-text index, or
    (ii) count the pattern occurrences by combining a plurality of further substrings into at least one third string with a particular delimiter character separating each of the substrings.

19. The non-transitory computer-accessible medium of claim 1, wherein the directed acyclic graph has two distinguished nodes.

20. The non-transitory computer-accessible medium of claim 19, wherein the two distinguished nodes are a source and a sink.

\* \* \* \* \*

UNITED STATES PATENT AND TRADEMARK OFFICE
CERTIFICATE OF CORRECTION

| | |
|---|---|
| PATENT NO. | : 10,346,551 B2 |
| APPLICATION NO. | : 14/763310 |
| DATED | : July 9, 2019 |
| INVENTOR(S) | : Mishra et al. |

It is certified that error appears in the above-identified patent and that said Letters Patent is hereby corrected as shown below:

In the Specification

Add a paragraph to include a Statement Regarding Federally Sponsored Research, under Column 1, after the "Cross-Reference to Related Application(s)" section, starting on Line 16, with the following paragraph:
"STATEMENT REGARDING FEDERALLY SPONSORED RESEARCH
This invention was made with government support under grant number CCF0926166 awarded by the National Science Foundation. Therefore, the government has certain rights in the invention."

Signed and Sealed this
Thirty-first Day of January, 2023

Katherine Kelly Vidal
*Director of the United States Patent and Trademark Office*